(12) United States Patent
Blonder

(10) Patent No.: US 8,146,739 B2
(45) Date of Patent: Apr. 3, 2012

(54) STORAGE MEDIUM CASE

(76) Inventor: Greg E. Blonder, Summit, NJ (US)

( * ) Notice: Subject to any disclaimer, the term of this patent is extended or adjusted under 35 U.S.C. 154(b) by 854 days.

(21) Appl. No.: 11/842,558

(22) Filed: Aug. 21, 2007

(65) Prior Publication Data

US 2009/0055844 A1    Feb. 26, 2009

(51) Int. Cl.
*G11B 17/03* (2006.01)

(52) U.S. Cl. ........ 206/308.1; 206/311; 206/1.5; 70/57.1

(58) Field of Classification Search ............ 206/303, 206/311, 307, 308.1, 312, 308.2, 309, 472–475, 206/1.5; 70/57.1, 63
See application file for complete search history.

(56) References Cited

U.S. PATENT DOCUMENTS

| | | | |
|---|---|---|---|
| 5,422,875 A | 6/1995 | Bribach | |
| 5,511,659 A | 4/1996 | Bosworth | |
| 5,590,769 A | 1/1997 | Lin | |
| 5,628,399 A | 5/1997 | Engen | |
| 5,682,990 A * | 11/1997 | Schluger | 206/308.1 |
| 5,819,928 A * | 10/1998 | Wynalda, Jr. | 206/308.1 |
| 5,913,419 A * | 6/1999 | Doodson | 206/308.1 |
| 6,056,117 A | 5/2000 | Courchesne | |
| 6,394,266 B1 | 5/2002 | Chou | |
| 7,198,149 B2 * | 4/2007 | Gelardi | 206/1.5 |
| 7,328,790 B2 * | 2/2008 | Andersen | 206/232 |
| 2005/0011784 A1 * | 1/2005 | Ulrich | 206/308.1 |
| 2005/0145512 A1 * | 7/2005 | Compton et al. | 206/308.1 |
| 2005/0145513 A1 * | 7/2005 | Takinami et al. | 206/308.1 |
| 2005/0199515 A1 * | 9/2005 | Laarman | 206/232 |
| 2005/0218018 A1 * | 10/2005 | Shields | 206/308.1 |
| 2005/0224377 A1 | 10/2005 | Lammerant | |
| 2006/0124749 A1 | 6/2006 | Osborn et al. | |

* cited by examiner

*Primary Examiner* — J. Gregory Pickett
*Assistant Examiner* — Robert Poon
(74) *Attorney, Agent, or Firm* — Lowenstein Sandler PC

(57) ABSTRACT

A case for storing a storage medium device, such as a compact disc or digital video disc, wherein the storage medium itself is used to transition the case from an unlocked position to a locked position, and vice versa. The case includes a front cover having a pocket, wherein when the storage medium is loaded in the pocket, the storage medium may be accessed via a latch window provided in the front cover, and moved to transition the case between the locked and unlocked positions. The latch window also provides the user with visual access to the interior of the pocket to determine whether a storage medium is loaded therein.

14 Claims, 5 Drawing Sheets

STORAGE MEDIUM CASE

FIELD OF THE INVENTION

The present invention relates generally to a storage medium case, and, more particularly, a compact disc (CD) and/or digital video disc (DVD) case wherein the CD/DVD serves as the mechanism to lock the case.

BACKGROUND OF THE INVENTION

Optical disks, such as compact discs (CDs) or digital video disks (DVDs), are a ubiquitous data storage and distribution media. Small (120 mm in diameter) and thin (~1.2 mm), these disks are typically sold or stored in standard-sized plastic "jewel" cases. Traditionally, these cases display printed material on the front and back covers and/or in the interior, and the disk is almost always restrained by a small plastic cleat grasping the medium by the center hole.

Billions of storage medium have been sold worldwide. Yet current packages exhibit a number of problems for manufacturers and consumers. For example, the standard CD/DVD "jewel" case is made from styrene plastic, which is fragile and brittle, causing it to crack relatively easily. In addition, the hinges of the case may shatter, even on the first time it is opened. Second, the case is sometimes difficult to recycle because it is constructed from a multitude of dissimilar materials. Third, it is often difficult to tell whether the case contains a storage medium or is empty.

Many other less common storage medium cases exist. Some are merely paper sleeves. However, these are 1) incompatible with CD/DVD storage units with conventional jewel-case-sized slots having a standard depth and/or thickness, 2) not sufficiently protective of the storage medium, 3) easy to shoplift, and 4) difficult to index because they lack a spine on which to print a title. Other designs are more elaborate, including ones incorporating springs, paper folios, and plastic mechanisms. However, these designs are expensive to manufacture and difficult to recycle.

In addition, conventional cases typically include components composed of a rigid material which are configured to interact or engage with one another in order to lock or latch conventional jewel cases in a closed configuration such that the storage medium is secured within the case. However, the typical construction of such locking mechanisms requires the use of a hard material (e.g., plastic), which is susceptible to breaking and/or cracking. In contrast, existing storage medium cases made of non-rigid materials do not include a mechanism for locking the case.

Accordingly, a need exists in the art for a storage medium case that is amenable to mass production, constructed from eco-friendly and recyclable materials which are not susceptible to breaking or cracking, which is capable of locking to protect the storage medium, and that allows one, without opening the case, to determine whether the case contains storage medium or is empty, while maintaining the utilities and functionality of a standard plastic "jewel" case.

SUMMARY OF THE INVENTION

Embodiments of the present invention satisfy these and other needs by providing a storage medium case, wherein the storage medium serves as a mechanism for transitioning the case between a locked and unlocked configuration.

According to an embodiment of the present invention, the case comprises a window opening which provides a user with both visual and physical access to the storage medium residing within the case when the case is in a closed position. In this regard, the window opening allows the user to determine whether a storage medium is enclosed within the case, without having to open the case. In addition, the window allows the user to contact the storage medium and physically move the storage medium to transition the case from an unlocked to a locked configuration, and vice versa.

Advantageously, the case eliminates the need for a conventional male-female engagement-type latching mechanism and/or cleat to hold the storage medium in place, as provided in a standard plastic "jewel" case, for example. Utilizing the storage medium as the basis for the locking mechanism allows for the use of cardboard rather plastic in the case's construction, making it easier to manufacture and recycle the case. Furthermore, the case may be sized and shaped to match the size and utilities of the standard plastic "jewel" case, thus making the case adaptable to existing case racks and towers.

According to an embodiment of the present invention, the case may be composed of any suitable material, including, but not limited to plastic. According to a preferred embodiment of the present invention, the case may be composed of a paper material such as cardboard and magazine stock. By composing the case of a paper material, the entire container to be recycled in the waste paper stream, as paper is a renewable resource. In addition, a paper-based case provides the appropriate sturdiness and robustness and avoids the brittleness of a plastic case, while weighing less than a standard plastic case (e.g., 70 gm for a cardboard case vs. 100 gm for a plastic case, including the weight of the CD and accompanying literature).

According to an embodiment of the present invention, a user may place the storage medium in a pocket of the case, and close the case by folding the case such that the front cover and back cover of the case are in contact. Then, with the case in a closed position, the user may access the storage medium via the window (provided in the front cover, back cover, or both) and move the storage medium into its locked position, thus locking the case in it's closed position, such that the case can not be opened by lifting the front cover.

BRIEF DESCRIPTION OF THE FIGURES

The present invention will be more readily understood from the detailed description of exemplary embodiments presented below, considered in conjunction with the attached drawings, of which.

It is to be understood that dashed or dotted lines are intended to represent features which are visible in an 'x-ray view' (i.e., looking through one or more outer surfaces), which may not be visible in the conventional view or perspective. It is to be further understood that the attached drawings are for purposes of illustrating the concepts of the invention and may not be to scale, and are not intended to be limiting in terms of the range of possible shapes and/or proportions.

DETAILED DESCRIPTION OF THE INVENTION

The present invention relates to a storage medium case wherein the storage medium that the case stores serves a secondary function as a latch, in addition to its primary function as a data distribution medium. As used herein, the term storage medium is intended to include, but is not limited to, a compact disc (CD), a digital video disc (DVD) or other suitable device.

FIGS. 1-5 illustrate an exemplary storage medium case 1 (herein referred to as the "case") according to embodiments of the present invention. The case 1 may be composed of any suitable material, including, but not limited to plastic or paper material (e.g., cardboard and magazine stock). According to a preferred embodiment, the case is composed of a recyclable paper material which is sufficiently rigid in composition to provide a protective enclosure for the storage medium and endure the typical wear and tear experienced by conventional storage medium cases. Since the storage medium itself is used as a latch, as described in detail below, the entire design of the case is simplified, allowing the use of a cardboard case rather than a plastic case, and thus making it easier to manufacture and recycle. One skilled in the art would be able to adapt the dimensions of the case to match various types, shapes, and sizes of storage medium. According to a preferred embodiment of the present invention, the case 1 is 14 cm (w)×12.5 cm (h)×1 cm (d), the standard dimensions of a conventional CD case.

Figure 1:
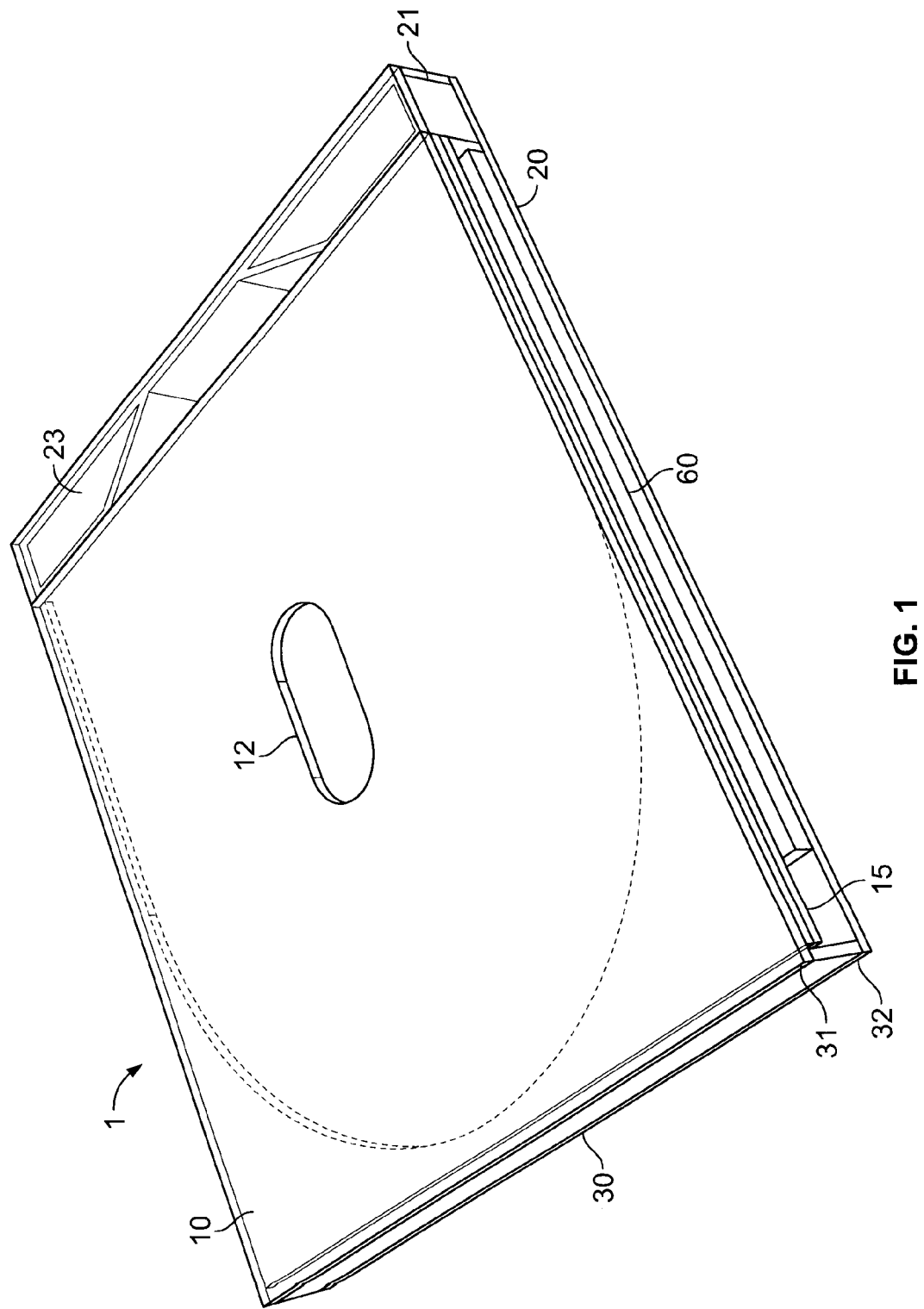
FIG. 1 is an "x-ray view" of a case without a storage medium loaded therein, according to an embodiment of the present invention.

As shown in FIG. 1, the case 1 comprises a front cover 10 including a latch window 12, a back cover 20 including an edge wall 21 having a recess 22, a recess cover 23, and a spine 30.

The front cover 10 is attached or connected to the back cover 20 by the spine 30 such that the front cover 10, back cover 20, and spine 30 form a book-like configuration. According to an embodiment of the present invention, the case 1 may be in an "open" or "opened" position (as shown in FIGS. 3 and 5) or a "closed" position (as shown in FIGS. 1 and 4).

Figure 3:
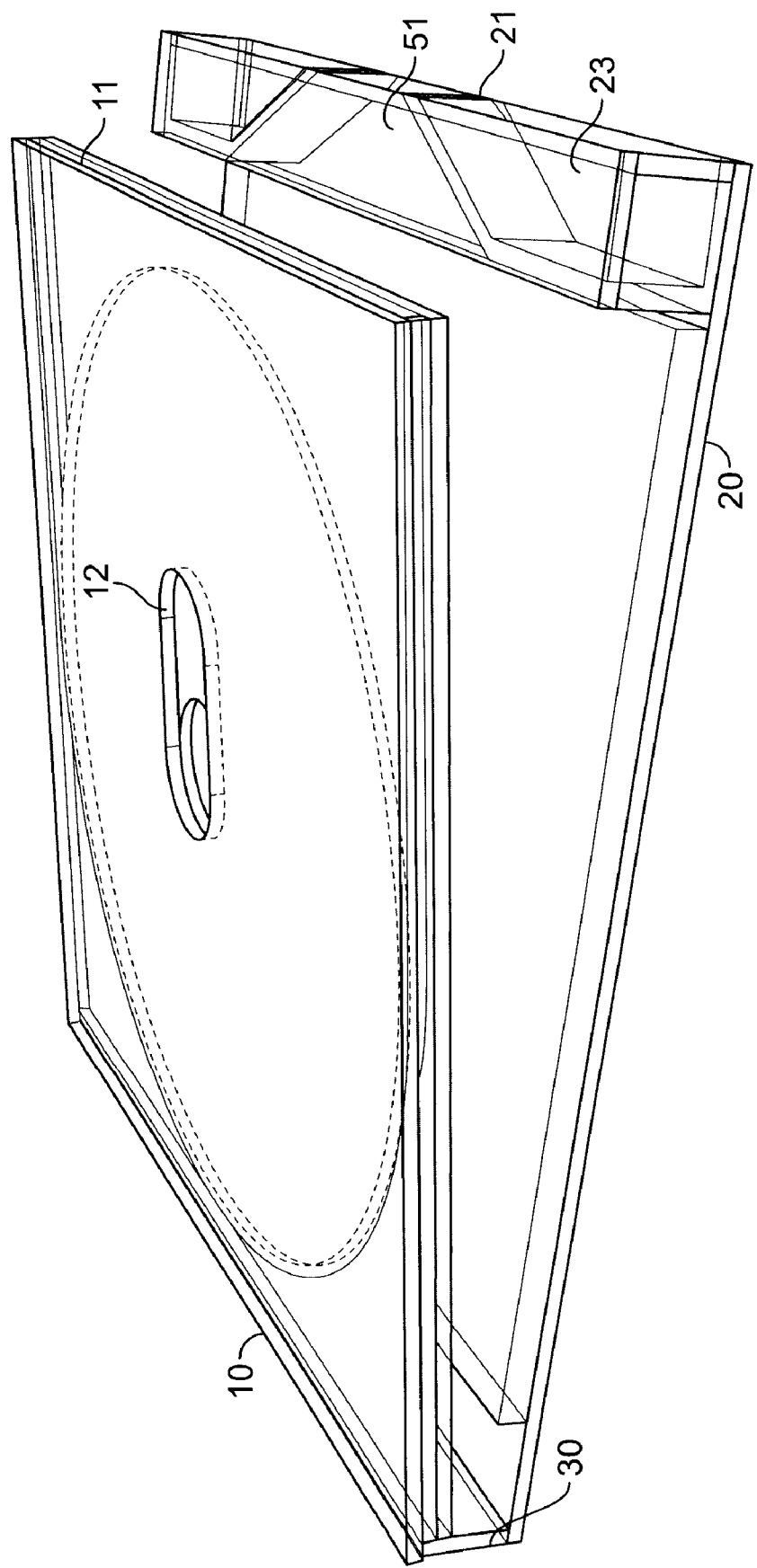
FIG. 3 is an 'x-ray view' illustrating an exemplary case in an open and unlocked position, according to an embodiment of the present invention.
Figure 4:
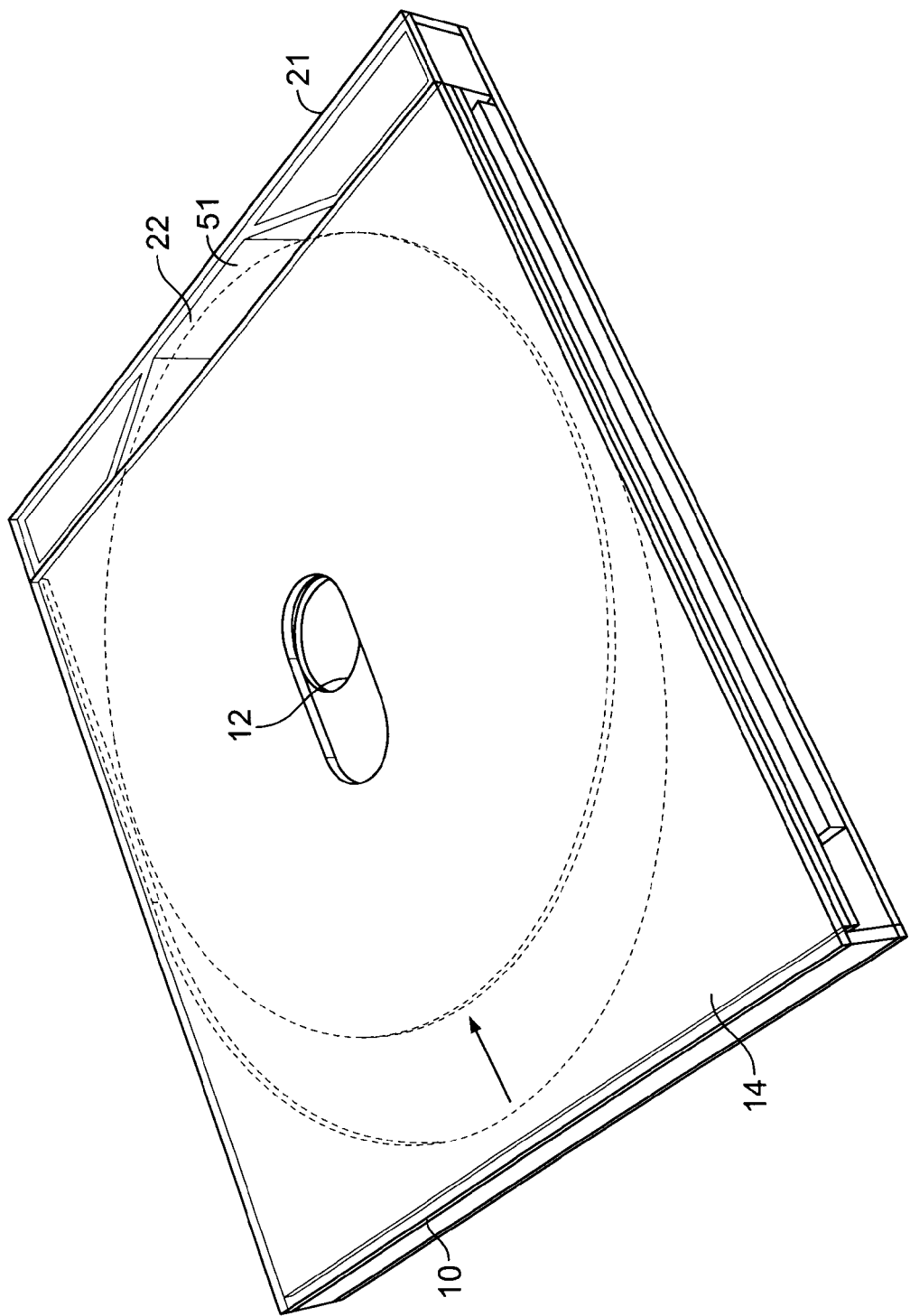
FIG. 4 is an 'x-ray view' illustrating the transition of an exemplary case from the unlocked to the locked position, according to an embodiment of the present invention.

As shown in FIG. 3, the front cover 10 comprises a pocket 11 which is adapted to receive and hold the storage medium 50. The pocket 11 comprises an open end sized and shaped such that the storage medium 50 may be inserted therein. According to an embodiment of the present invention, the open end of the pocket 11 adapted to receive the storage medium 50 is located at the end opposite the spine 30.

Figure 2:
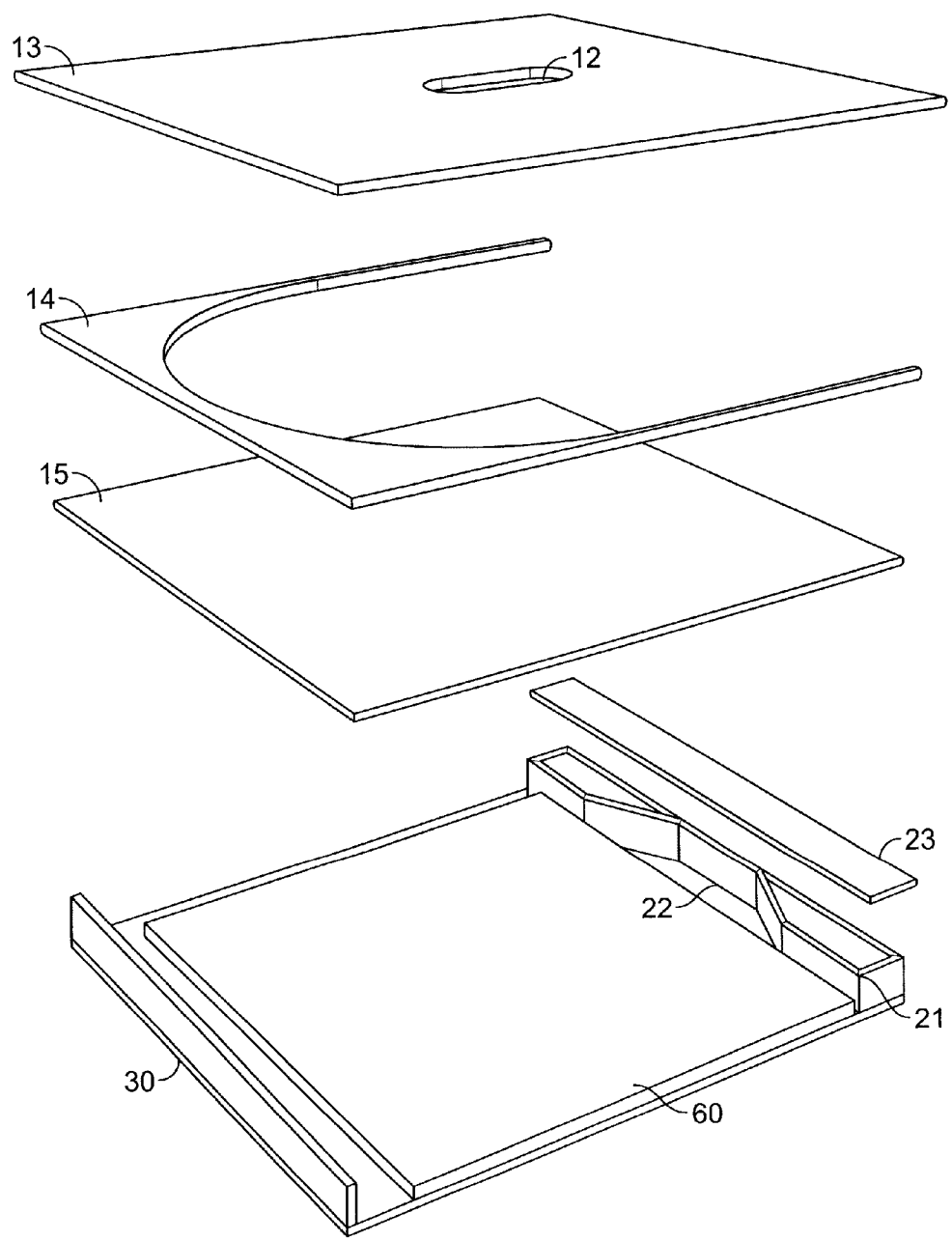
FIG. 2 is an exploded view of a storage medium case, according to an embodiment of the present invention.

As shown in FIG. 2, according to an embodiment of the present invention, the pocket 11 may be formed by a top panel 13 and a bottom panel 15. Optionally, a spacer 14 may be disposed in between the top panel 13 and the bottom panel 15. The spacer 14 is advantageously slightly thinner than the storage medium 50 to create a tight fit between the storage medium 50 and the pocket 11. One having ordinary skill in the art will appreciate that the pocket 11 may be formed without the use of the spacer 14, by attaching the top panel 13 to the bottom panel 15 such that an enclosure is formed therebetween. According to an embodiment of the present invention, the spacer 14 is adapted to create sufficient space for the storage medium 50 to slide into and out of the pocket 11 as desired, while allowing the storage medium 50 to remain securely stowed in the pocket 11. As described above, the space in between the top panel 13 and the bottom panel 15, with or without the spacer 14, forms the pocket 11 into which the storage medium may be inserted.

Figure 5:
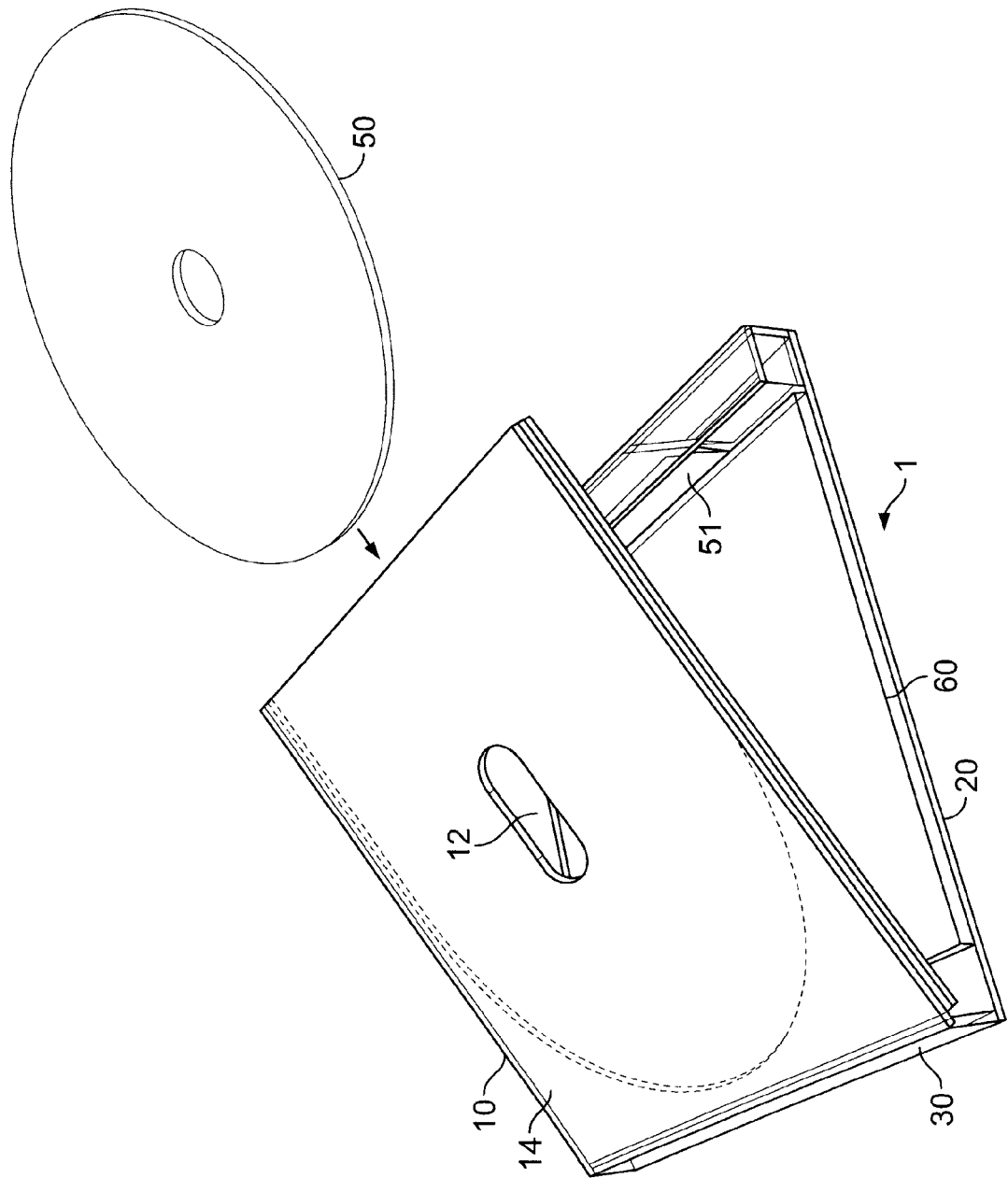
FIG. 5 is an 'x-ray view' showing an exemplary case in an unlocked position, prior to loading of a storage medium, according to an embodiment of the present invention.

As shown in FIG. 5, the storage medium 50 may be slid into the pocket 11 of the front cover 10 via the open end of the pocket 11 when the case 1 is in the open position. The front cover 10 also comprises a latch window 12, preferably at its center, the latch window 12 providing both visual access and physical access to the storage medium 50 when it is positioned within the pocket 11. Advantageously, visual access to the interior of the pocket 11 allows a user to determine whether or not a storage medium 50 has been loaded in the case 1 when the case is in either the open or closed position. For example, a user may look into the latch window 12 of the closed case 1 and determine that either 1) no storage medium 50 is loaded in the pocket 11 (as shown in FIG. 1) or 2) a storage medium 50 is loaded in the pocket 11 (as shown in FIG. 4). Advantageously, this determination may be made without having to open the case 1.

The latch window 12 also allows a user physical access to the storage medium 50 when it is loaded in the pocket 11. Although FIGS. 1-5 depict the latch window 12 as having an oval or elliptical shape, one having ordinary skill in the art will appreciate that the latch window 12 may be any suitable shape and/or size.

The back cover 20 comprises an edge wall 21 is located at the end of the back cover 20 which is opposite the spine 30, as shown in FIGS. 1-5. The edge wall 21 is positioned such that it is in communication with the open end of the front cover 10 when the case 1 is in the closed position, as shown in FIGS. 1 and 4. According to an embodiment of the present invention, the edge wall 21 may be a contiguous or integral section of the back cover 20. Alternatively, the edge wall 21 may be a freestanding component which is attached to the back cover 20 by any suitable attachment means, such as, for example, glue or other adhesive material. Generally, the edge wall 21 has a height equal or substantially equal to the height of the spine 30.

According to an embodiment of the present invention, the edge wall 21 comprises a recess 22, as shown in FIGS. 1-5. The recess 22 is indentation or cavity formed in the edge wall 21 which is adapted to receive the storage medium 50 when the storage medium 50 is moved therein. One having ordinary skill in the art will appreciate that the recess 22 may be any suitable size and shape to accept the storage medium when the case 1 is transitioned into the locked configuration, as described in detail below. FIG. 2 depicts an exemplary recess 22 having a top interior surface and two angled side surfaces. One having ordinary skill in the art will appreciate that the recess 22 may have a curved interior surface (i.e., an arc-shaped interior surface) or other shape, suited for the particular storage medium 50 that is intended to be stored in the case 1.

According to an embodiment of the present invention, the case 1 comprises a recess cover 23 which at least partially covers the recess 22 such that an enclosure 51 is provided. The enclosure 51 includes an open end which is in communication with the open end of the pocket 11 when the case 1 is in the closed position. According to an embodiment of the present invention, the enclosure 51 comprises a partially enclosed space which is partially surrounded on its sides by the surfaces of the recess 22 in the edge wall 21 such that an open side is provided which is adapted to receive the storage medium 50, wherein the enclosure 51 is at least partially covered on top by the recess cover 23. One having ordinary skill in the art will appreciate that the recess cover 23 is presented with a transparent body in FIGS. 1, 3, 4 and 5 to facilitate illustration of the recess 22 and enclosure 51. One having ordinary skill in the art will further appreciate that the recess cover 23 may be composed of any suitable solid (as shown in FIG. 2), transparent, or composite material.

According to an embodiment of the present invention, the case 1 comprises a spine 30 which connects, attaches or otherwise mates the front cover 10 and the back cover 20, such that the front cover 10, back cover 20 and spine 30 form a book-like configuration. According to an embodiment of the present invention, the spine 30 includes a top edge connected with the front cover 10 to form a first hinge 31. The spine 30 also includes a bottom edge connected to the back cover 20 to form a second hinge 32. The first and second hinges 31, 32 allow the case 1 to be opened by lifting the front cover 10 and/or back cover 20. Alternatively, the spine 30 may consist of a single edge, which is formed by the direct attachment or connection of the front cover 10 and the back cover 20. This embodiment of the case 1 would be similar in dimension and shape to a conventional thin CD/DVD "sleeve" case. Optionally, the case 1 may include printed material 60, preferably on the interior surface of the back cover 20, as shown in FIG. 1-5. One having ordinary skill in the art will appreciate that the printed materials 60 may be placed within a corresponding depression, holder, tray, or similar structure formed on the interior surface of the back cover 20.

The following section describes the transition of the case 1 from an unlocked position to a locked position. First, the storage medium 50 is loaded into the pocket 11 of the front cover 10 when the case is in the open position, the loading action illustrated by the arrow shown in FIG. 5. The storage medium 50 is properly loaded within the pocket 11 when the storage medium 50 is positioned within the pocket 11 such that no portion the storage medium 50 extends out of the open end of the pocket 11. According to an embodiment of the present invention, the storage medium 50 may be properly loaded such that the case 1 is in the unlocked position by causing the leading edge of the storage medium 50 to make contact with the spacer 14 (or the spine-side edge of the pocket 11 according to an embodiment which does not include the spacer 14).

When the storage medium 50 is completely enclosed with the pocket 11, the case 1 may be closed and locked, as shown in FIG. 4. In the unlocked position, the hole in the center of the storage medium 50 is in alignment with the latch window 12 such that the storage medium 50 may be moved or toggled toward the edge wall 21 by a user.

To transition the case 1 from the unlocked to the locked position, the user accesses the storage medium 50 via the latch window 12, and slides a portion of the storage medium 50 into at least a portion of the enclosure 51 formed by the recess 22 and recess cover 23. The movement of the storage medium 50 when transitioning the case 1 from the unlocked to the locked position is identified in FIG. 4 by the action arrow.

In the locked position, when a user attempts to open the case 1 by lifting the front cover 10, the portion of the storage medium 50 in the enclosure 51 makes contact with at least a portion of the recess cover 23, thereby preventing the front cover 10 from opening, and maintaining the case 1 in the closed and locked position. The communication between the storage medium 50 and the recess cover 23 operate as the locking mechanism for the case 1.

According to an embodiment of the present invention, for a case 1 comprised of folded cardboard, when the case 1 is in the locked configuration, the natural springing quality of the first and second hinges 31, 32 tends to cause the front cover 10 to push upwardly (i.e., away from the back cover 20), which in turn causes the storage medium 50 to press tightly against the recess cover 23, thereby maintaining the case 1 in the closed and locked position. Optionally, printed material 60 may be included on the interior surface of the back cover 20, wherein the printed material 60 causes an upward force against the front cover 10 which further maintains the storage medium 50 against the recess cover 23. These optionally features help to keep the storage medium 50 from inadvertently sliding into an undesired position. One having ordinary skill in the art will appreciate that even absent these optional features, the friction and contact between the storage medium 50 and the pocket 11 operate to keep the storage medium 50 from inadvertently sliding or moving into another position.

To unlock the case 1 (i.e., transition from the unlocked position to the locked position), the user accesses the storage medium 50 via the latch window 12 and moves the storage medium 50 out of communication with the enclosure 51, such that when one attempts to lift the front cover 10, the storage medium 50 does not come into contact with the recess cover 23, thereby allowing the front cover 10 to be lifted and the case 1 to be opened.

The unlocked position may be used to remove the storage medium 50 from the pocket 11, or to read or access any printed materials 60 provided within the case 1.

One having ordinary skill in the art will appreciate that the user may insert his or her finger in the hole located in the center of standard CDs and DVDs to facilitate the movement of the storage medium 50 when transitioning the case 1 from its unlocked to its locked position, and vice versa, and when loading/removing the storage medium 50 into and out of the pocket 11.

FIG. 5 shows the case 1 in its open and unlocked configuration, with the storage medium 50 removed from the pocket 11. According to an embodiment of the present invention, the case 1 may be designed such that when the storage medium 50 is removed from the pocket 11, the interior surface of the back cover 20 is visually accessible via the latch window 12 when the case 1 is in the closed position. For example, the interior surface of the back cover 20 may be of a color or design which is in contrast to that of the exterior surface of the front cover 10 to allow the user to visually determine if the case 1 is empty or loaded, by looking through the latch window 12.

According to an embodiment of the present invention, a single sheet of material (e.g., cardboard) may be folded or otherwise configured to form five substantially rectangular-shaped components—the front cover 10, the back cover 20, the spine 30, the edge wall 21, and the recess cover 23.

One having ordinary skill in the art will appreciate the case 1 dimensions may advantageously match those of a standard CD or DVD case. This allows the case 1 to be compatible with standard storage units such that the spine 30 may comprise a label including identifying information to facilitate reference and/or indexing.

According to an embodiment of the present invention, the case 1 may be manufactured according to standard and well-known cardboard packing and printing technologies. One having ordinary skill in the art will appreciate that various embodiments and/or optional features are within the scope of the present invention, including, the use of adhesives or detents to further restrain the storage medium 50 within the pocket 11, and/or the inclusion of one or more additional pockets to hold one or more additional storage medium. According to an embodiment of the present invention, the case 1 may include one or more additional side panels to front and back covers 10, 20, such that all six faces of the case 1 are sealed when the case 1 is closed.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A product comprising a case with a storage medium, the product comprising:
    a front cover comprising a pocket having an open end adapted to receive the storage medium and a latch window providing access to the storage medium;
    a back cover attached to the front cover by a spine, the back cover comprising an edge wall having a recess;
    a recess cover at least partially covering the recess, thereby forming an enclosure; and
    the storage medium positioned in the pocket, wherein the case is locked with a portion of the storage medium moved into the enclosure, such that when a user lifts the front cover, the portion of the storage medium in the enclosure comes into contact with the recess cover, thereby maintaining the case in the locked position.

2. The product according to claim 1, wherein the front cover comprises a top panel and a bottom panel adapted to form the pocket.

3. The product according to claim 2, wherein the front cover further comprises a spacer disposed between the top panel and the bottom panel.

4. The product according to claim 1, wherein the storage medium comprises a compact disc (CD).

5. The product according to claim 1, wherein the storage medium comprises a digital video disc (DVD).

6. The product according to claim 1, wherein the storage medium case is partially comprised of paper material.

7. The product according to claim 6, wherein the paper material comprises cardboard.

8. The product according to claim 1, wherein a first edge of the spine attaches to the front cover to form a first hinge which facilitates opening of the storage medium case.

9. The product according to claim 8, wherein a second edge of the spine attaches to the back cover to form a second hinge which facilitates opening of the storage medium case.

10. The product according to claim 1, further comprising printed material disposed therein.

11. The product according to claim 1, wherein the latch window provides a user with visual access to the pocket.

12. The product according to claim 1, wherein the access provided by the latch window allows the user to move the storage medium when loaded within the pocket to transition the case between an unlocked position and the locked position, and vice versa.

13. The product according to claim 1, wherein a single sheet of material is configured to form the front cover, the back cover, the spine, and the recess cover.

14. The product according to claim 13, wherein the single sheet of material is comprised of cardboard.

* * * * *